United States Patent
Hakamata et al.

(10) Patent No.: US 10,552,635 B2
(45) Date of Patent: Feb. 4, 2020

(54) ENCODING METHOD, ENCODING DEVICE, DECODING METHOD AND DECODING DEVICE

(71) Applicant: FUJITSU LIMITED, Kawasaki-shi, Kanagawa (JP)

(72) Inventors: Junki Hakamata, Yokohama (JP); Yukari Hakamata, Yokohama (JP); Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 15/714,631

(22) Filed: Sep. 25, 2017

(65) Prior Publication Data

US 2018/0101698 A1    Apr. 12, 2018

(30) Foreign Application Priority Data

Oct. 6, 2016   (JP) ................................ 2016-198442

(51) Int. Cl.
*G06F 7/04*     (2006.01)
*G06F 21/62*    (2013.01)

(52) U.S. Cl.
CPC ...... *G06F 21/6245* (2013.01); *G06F 21/6209* (2013.01)

(58) Field of Classification Search
CPC ............. G06F 21/6254; H04L 63/0407; H04L 63/0421
See application file for complete search history.

(56) References Cited

U.S. PATENT DOCUMENTS

| | | | |
|---|---|---|---|
| 2002/0019934 A1 | 2/2002 | Ishizaki | |
| 2006/0101285 A1* | 5/2006 | Chen | G06F 21/602 713/193 |
| 2012/0131075 A1* | 5/2012 | Mawdsley | G06F 21/6254 707/825 |

FOREIGN PATENT DOCUMENTS

JP    2002-055608    2/2002

* cited by examiner

*Primary Examiner* — Olugbenga O Idowu
(74) *Attorney, Agent, or Firm* — Fujitsu Patent Center

(57) ABSTRACT

An encoding program causes a computer to execute a process of inputting thereto a CSV file having a plurality of records each including a plurality of item which are separated by a delimiter. The encoding program causes the computer to execute a process of generating an encoded file having encoded data and an encoded dictionary each in which a specific item included in the records of the input CSV file is encoded by word or numerical value. The encoding program causes the computer to execute a process of generating an encrypted file including an encrypted dictionary in which the encoded dictionary is encrypted, from the generated encoded file.

11 Claims, 13 Drawing Sheets

ENCODING METHOD, ENCODING DEVICE, DECODING METHOD AND DECODING DEVICE

CROSS-REFERENCE TO RELATED APPLICATIONS

This application is based upon and claims the benefit of priority of the prior Japanese Patent Application No. 2016-198442, filed on Oct. 6, 2016, the entire contents of which are incorporated herein by reference.

FIELD

The embodiments discussed herein are related to an encoding program, an encoding method, an encoding device, a decoding program, a decoding method, and a decoding device.

BACKGROUND

In recent years, highly confidential information including My Number (Individual Number) increases and it is expected that it will increase in future. My Number is a public number prescribed for each individual based on the Social Security and Tax Number System (so-called My Number System) in Japan. Various pieces of individual information are associated with My Number. Because of this, My Number is confidential information to avoid leakage. Therefore, it is predicted that technology for concealing the confidential information with higher security strength than before is needed in the future. Normally, when any file containing the confidential information is to be concealed, it is conceivable to encrypt the entire file.

Patent Literature 1: Japanese Laid-open Patent Publication No. 2002-055608

However, when the file containing the confidential information is to be used, there is a case where there is no need to display or describe the confidential information. For example, it is stipulated that a withholding slip does not require My Number to be described when using it for income proof. In this case, there is no need to decode the information of My Number, and the decoding of the information is more likely to cause the risk of information leakage to increase.

For example, as an item, let us consider text files such as a comma-separated values (CSV) file containing confidential information such as My Number. The CSV file is a text file using a comma "," as a delimiting character (delimiter) for delimiting information for a plurality of items when the information for the items are listed. The CSV file is widely used as a text file expressing a table structure in an input/output format of various applications such as spreadsheet, database, or form, and it is considered that confidential information is included in the file. Conventionally, however, when the CSV file is to be encrypted, the entire CSV file is encrypted. Therefore, only some items of the confidential information are not capable of being flexibly protected.

SUMMARY

According to an aspect of an embodiment, a non-transitory computer-readable recording medium stores therein a program that causes a computer to execute a process. The process includes when a text file having a plurality of records each including a plurality of items which are separated by a delimiter is input, generating an encoded file having encoded data and an encoded dictionary each in which a specific item included in the records of the input text file is encoded by word or numerical value; and generating an encrypted file including an encrypted dictionary in which the encoded dictionary is encrypted, from the generated encoded file.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. In addition, the scope of the right is not limited by the embodiments. The embodiments may be appropriately combined with each other if the processing contents do not conflict.

[a] First Embodiment

Overview of Processing

Figure 1:
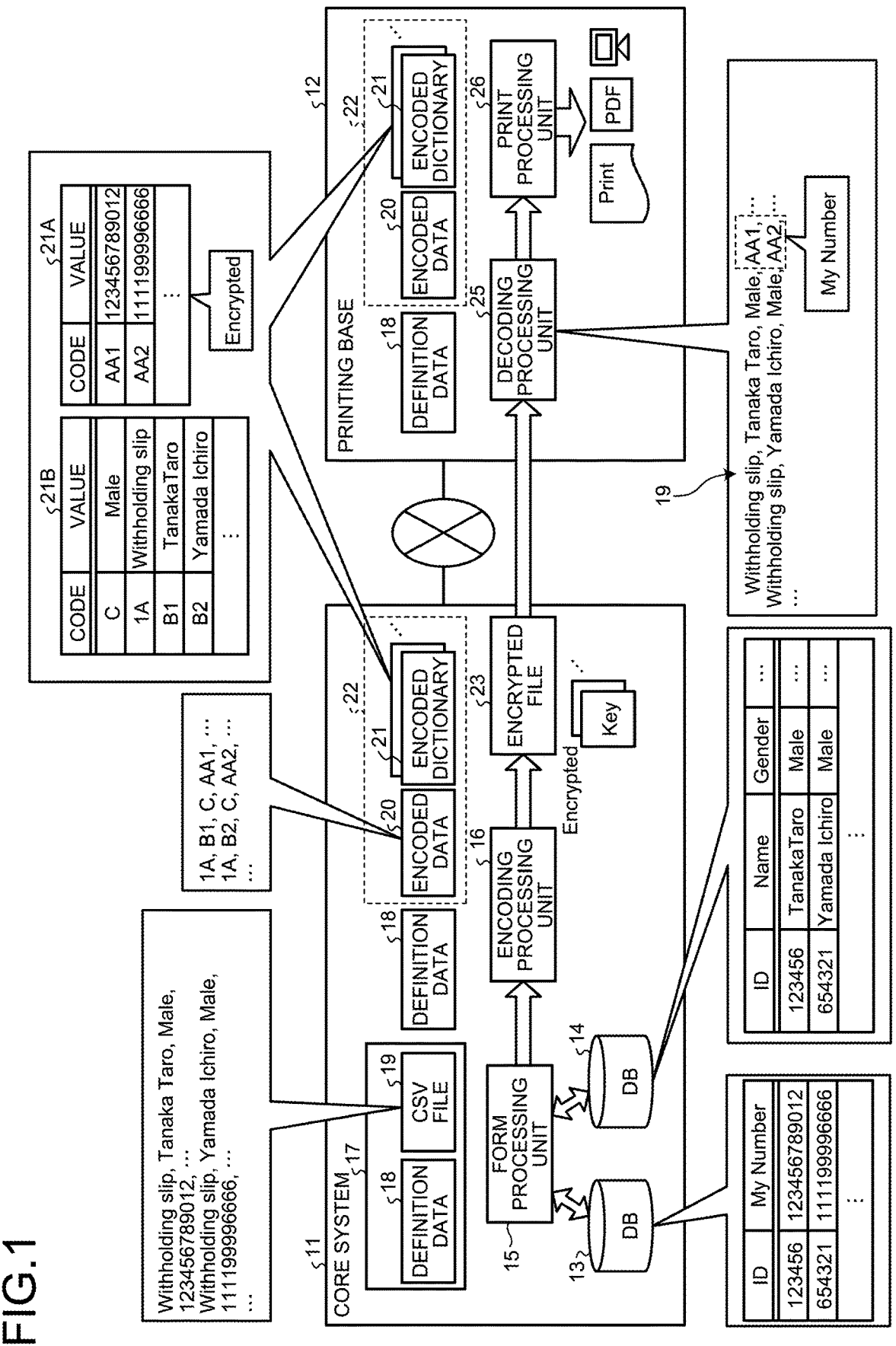
FIG. 1 is a diagram schematically illustrating a flow of printing a form.

First of all, an overview of encoding and decoding of a text file containing confidential information will be explained below with reference to FIG. 1. In the following, a case where the processing is applied to a system for printing a form will be explained as an example. FIG. 1 is a diagram schematically illustrating a flow of printing a form. FIG. 1 represents a core system 11 and a printing base 12. The core system 11 includes a database (DB) 13 that stores confidential information and a DB 14 that stores information other than the confidential information. The DB 13 stores My Numbers, as confidential information, associated with identification data (ID). The DB 14 stores Name and Gender etc. associated with ID.

The core system 11 includes a form processing unit 15 and an encoding processing unit 16. The form processing unit 15 generates form data 17 according to a form to be printed. For example, the form processing unit 15 creates definition data 18 for defining the format of a form and arrangement positions of items, and the form data 17 including a CSV file 19 that stores data for each item. The CSV file 19 stores a plurality of records each including data for a plurality of items that are separated by a comma.

Here, when forms for many users are to be printed, the CSV file 19 may have a data amount of several hundreds of MBs to several GBs. When a large-capacity CSV file 19 is to be stored or transferred or so, encoding such as compression improves efficiency of resources and transfer time.

Therefore, the encoding processing unit 16 performs encoding of the form data 17. The form data 17 to be encoded is input to the encoding processing unit 16. The encoding processing unit 16 encodes the input form data 17 to generate an encoded file 22. For example, the encoding processing unit 16 generates the encoded file 22 having encoded data 20 and an encoded dictionary 21 each in which items included in the records of the CSV file 19 contained in the form data 17 are encoded by word or numerical value. For example, the encoding processing unit 16 encodes an item of My Number by numerical value to generate an encoded dictionary 21A corresponding to the item of My Number. Moreover, the encoding processing unit 16 encodes items other than the item of My Number by word or numerical value to generate an encoded dictionary 21B corresponding to the items other than the item of My Number. Then, the encoding processing unit 16 generates the encoded data 20 in which the data of the item of My Number is encoded by using the encoded dictionary 21A and the data of the items other than the item of My Number are encoded by using the encoded dictionary 21B. In addition, data of the items other than the item of My Number may also be encoded by generating the encoded dictionary 21 for each item.

The encoding processing unit 16 individually encrypts the encoded dictionary 21A corresponding to the item of My Number using an encryption key. The encoding processing unit 16 also encrypts the entire data using an encryption key different from the encryption key of the encoded dictionary 21A. For example, the encoding processing unit 16 generates an encrypted file 23 by encrypting the entire data such as the definition data 18, the encoded data 20, an encrypted dictionary obtained by encrypting the encoded dictionary 21A, and the encoded dictionary 21B using an encryption key. In addition, the encoding processing unit 16 may encrypt indirectly the entire data by individually encrypting the encoded dictionary 21B corresponding to each of the items other than the item of My Number. The encrypted file 23, an entire decryption key corresponding to the encryption key used to encrypt the entire data, and an individual decryption key corresponding to the encryption key used to individually encrypt the encoded dictionary 21A are transmitted to the printing base 12. When the printing base 12 stores the entire decryption key and the individual decryption key and when these keys can be acquired separately, the entire decryption key and the individual decryption key do not have to be transmitted to the printing base 12.

The printing base 12 includes a decoding processing unit 25 and a print processing unit 26. The decoding processing unit 25 decrypts the encrypted file 23 by using the entire decryption key to be restored to the definition data 18, the encoded data 20, the encrypted dictionary obtained by encrypting the encoded dictionary 21A, and the encoded dictionary 21B. In this state, the encoded dictionary 21B is not encrypted and is returned to the original data. Therefore, the items other than the item of My Number can be decoded to the data of the CSV file 19 by using the encoded dictionary 21B. On the other hand, the encoded dictionary 21A is still kept encrypted with the encryption key. Therefore, My Number is not capable of being decrypted. When My Number is the item to be output, the decoding processing unit 25 decrypts the encoded dictionary 21A by using the individual decryption key. On the other hand, when My Number is not the item to be output, the decoding processing unit 25 does not decrypt the encoded dictionary 21A. For example, it is stipulated that the withholding slip does not require My Number to be described thereon when using it for income proof. In this case, the decoding processing unit 25 does not decrypt the encoded dictionary 21A. The example of FIG. 1 represents a case where because My Number is not the item to be output, the code of the item of My Number in the CSV file 19 is not capable of being correctly decoded to My Number on the printing base 12 side and My Number is in the encrypted state.

The print processing unit 26 generates the data for printing using the decoded CSV file 19 and definition data 18, and prints the withholding slip. However, the print processing unit 26 may generate and output data of a print image such as a Portable Document Format (PDF) using the decoded CSV file 19 and definition data 18. Because the item of My Number on the printed withholding slip is in the encrypted state, My Number is not correctly printed. On the other hand, when My Number is the item to be output, because the decoding processing unit 25 decrypts the data of My Number to the CSV file 19, My Number is correctly printed. Thus, the data of My Number can be flexibly protected by using the same encrypted file 23. Here, it is not configured to simply switch between display and non-display of the data of My Number when My Number is to be printed. When My Number is not printed, the encoded dictionary 21A is in the encrypted state. Therefore, the data of My Number is not capable of being restored. This makes it possible to protect the data of My Number even if the encoded data 20 and the encoded dictionary 21A are, for example, hacked.

Device Configuration

Figure 2:
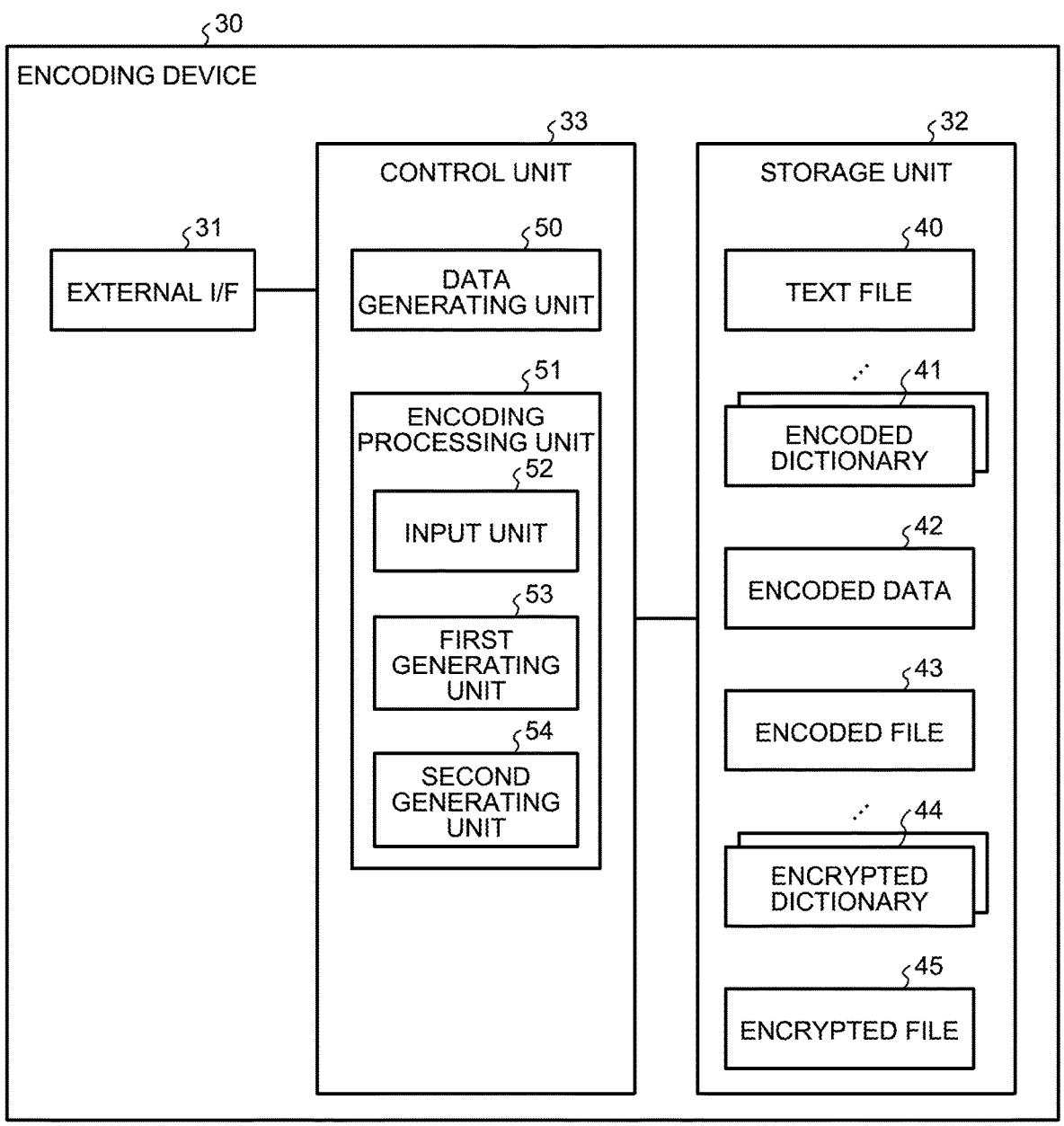
FIG. 2 is a diagram illustrating an example of a configuration of an encoding device.

A configuration of each device will be explained next. First of all, the configuration of an encoding device 30 will be explained. FIG. 2 is a diagram illustrating an example of the configuration of the encoding device. The encoding device 30 is a device that performs encoding such as compression and encryption. The encoding device 30 is an information processing device such as a computer including a personal computer and a server computer, a tablet terminal, and a smartphone. For example, in the example of FIG. 1, the encoding device 30 is a computer operating as the core system 11. The encoding device 30 may be implemented as a single computer or as a cloud by a plurality of computers. The present embodiment will explain a case, as an example, where the encoding device 30 is implemented as a single computer. As illustrated in FIG. 2, the encoding device 30 includes an external interface (I/F) 31, a storage unit 32, and a control unit 33. However, the encoding device 30 may include any device other than the devices included in the computer or the information processing device.

The external I/F 31 is, for example, an interface that transmits/receives various pieces of information to/from other devices. The external I/F 31 is a port that inputs/outputs data to/from a storage medium such as a flash memory, a communication port that performs wired communication using a cable or the like, or a communication interface that performs wireless communication.

The storage unit 32 is a storage device such as a hard disk, a solid state drive (SSD), and an optical disk. The storage unit 32 may be a data-rewritable semiconductor memory such as a random access memory (RAM), a flash memory, and a non-volatile static random access memory (NVS-RAM).

The storage unit 32 stores an operating system (OS) and various programs executed by the control unit 33. For example, the storage unit 32 stores programs for performing encoding processing, encoded-file generation processing, and encryption processing, which will be explained later. Moreover, the storage unit 32 stores various data used in the programs executed by the control unit 33. For example, the storage unit 32 stores a text file 40, an encoded dictionary 41, encoded data 42, an encoded file 43, an encrypted dictionary 44, and an encrypted file 45.

The text file 40 is data in which various pieces of information to be encoded are stored. For example, the text file 40 has a plurality of records, such as the CSV file 19 illustrated in FIG. 1, each including a plurality of items which are separated by a delimiter.

The encoded dictionary 41 is a data of the dictionary used for data encoding and data decoding. For example, the encoded dictionary 41 corresponds to the encoded dictionary 21 in the example of FIG. 1. In the present embodiment, when the data of the items separated by the delimiter in the text file 40 is to be encoded, encoding is performed by switching the encoded dictionary 41 for each item or for each items. The encoded dictionary 41 stores a code corresponding to data of an item for each item to be encoded. For example, the encoded dictionary 41 stores a dynamically assigned code corresponding to characteristics of units of words or numerical values by word or numerical value appearing in an item for each item to be encoded. For example, a short code is assigned to a word or a numerical value with a high appearance frequency, and dynamically assigned codes are stored in the encoded dictionary 41. When a pattern of appearing character strings and numbers or so is determined as a specific pattern for each item to be encoded, the specific pattern and the code may be previously stored in the encoded dictionary 41 in association with each other. Moreover, item information indicating an encoded item may be included in the encoded dictionary 41.

The encoded data 42 is data obtained by encoding the data of each item in the text file 40 with the encoded dictionary 41.

The encoded file 43 is data obtained by combining the encoded data 42 and encoded dictionaries 41 for the encoded items of the encoded data 42 into one file.

The encrypted dictionary 44 is data obtained by encrypting the encoded dictionary 41. The encrypted file 45 is data obtained by encrypting the encoded file 43.

The control unit 33 is a device that controls the encoding device 30. As the control unit 33, an electronic circuit such as a central processing unit (CPU) and a micro processing unit (MPU) and an integrated circuit such as an application specific integrated circuit (ASIC) and a field programmable gate array (FPGA) can be adopted. The control unit 33 includes an internal memory for storing programs that define various procedures and control data, and executes various types of processing using these programs and data. The control unit 33 functions as various processing units by operating the various programs. For example, the control unit 33 includes a data generating unit 50 and an encoding processing unit 51.

The data generating unit 50 generates the text file 40 having a plurality of records in which the data of items are separated by a delimiter. The data generating unit 50 corresponds to the form processing unit 15 in the example of FIG. 1. The text file 40 may be generated by any other device.

The encoding processing unit 51 encodes the data of the items in the text file 40 by an encoding system according to each item. The encoding processing unit 51 includes an input unit 52, a first generating unit 53, and a second generating unit 54.

The input unit 52 receives an input of text data to be encoded. For example, the text file 40 is input to the input unit 52.

The first generating unit 53 generates the encoded data 42 and the encoded dictionary 41, each in which data is encoded, from the text file 40 and generates the encoded file having the encoded data 42 and the encoded dictionary 41. For example, the first generating unit 53 assigns codes to the data of the items in the text file 40, and registers a code and data assigned with the code in the encoded dictionary 41 corresponding to the item in association with each other. As for the code, an appearance frequency of each word or numerical value included in the data of each item is calculated, and a short code is assigned to a word or a numerical value with a high appearance frequency. When a pattern of appearing character strings or numbers or so is determined as a specific pattern, the specific pattern associated with the code may be previously stored in the encoded dictionary 41. In addition, the first generating unit 53 may assign codes in order from the short code in each appearance of different data.

The first generating unit 53 then converts the data into the code for each item of the text file 40 using the encoded dictionary 41 corresponding to the item, and generates the encoded data 42 in which the data is converted into the code. For example, when a word or a numerical value is included in the data of the item in the text file 40, the first generating unit 53 converts the data to the code corresponding to the word or the numerical value stored in the encoded dictionary 41. The first generating unit 53 generates the encoded file 43 having the generated encoded data 42 and the encoded dictionary 41 used for encoding the encoded data 42. For example, the first generating unit 53 generates the encoded file 43 that includes the encoded data 42 as a data portion and each encoded dictionary 41 as a trailer portion.

In addition, the first generating unit 53 may include the item information indicating encoded items in the encoded dictionary 41. In this case, the first generating unit 53 may assign a code to each item to be encoded so as to be unique and register the assigned code in the encoded dictionary 41 corresponding to the item. In other words, the code may be duplicated for each item to be encoded. For example, the first generating unit 53 assigns a code to the data of the item for each item of the text file 40 so as to be unique, and registers the code in the encoded dictionary 41 corresponding to the item. As for the code, an appearance frequency of each word or numerical value included in the data is calculated for each item, and a short code is assigned to the word or the numerical value with a high appearance frequency. In this way, by assigning the code to each item to be encoded so as to be unique, it is possible to assign the duplicated short code to each item to be encoded, thus encoding the data with a high compression ratio for each item to be encoded. When a pattern of appearing character strings or numbers or so is determined as a specific pattern, the specific pattern associated with the code may be previously stored in the encoded dictionary 41 corresponding to the item to be encoded. In addition, the first generating unit 53 may assign codes in order from the short code in each appearance of different data.

The second generating unit 54 generates the encrypted file 45 including the encrypted dictionary 44 obtained by encrypting the encoded dictionary 41 from the generated encoded file 43. For example, the second generating unit 54 individually encrypts the encoded dictionary 41 corresponding to an item in which confidential information is stored. In addition, by individually encrypting the encoded dictionary 41 corresponding to an item other than the item in which confidential information is stored, the second generating unit 54 encrypts the entire encoded file 43. The encryption key may be generated following predetermined regulations in each encryption or may be previously defined. Then, the second generating unit 54 generates the encrypted file 45 including the encoded data 42 as a data portion and also including the encoded dictionary 41 or the encrypted dictionary 44 for each item as a trailer portion. In addition, the second generating unit 54 may collectively encrypt items other than the item in which confidential information is stored by encrypting the entire encoded file 43. Moreover, the second generating unit 54 may encrypt the encoded dictionary 41 for only part of the items other than the item storing confidential information.

Figure 3:
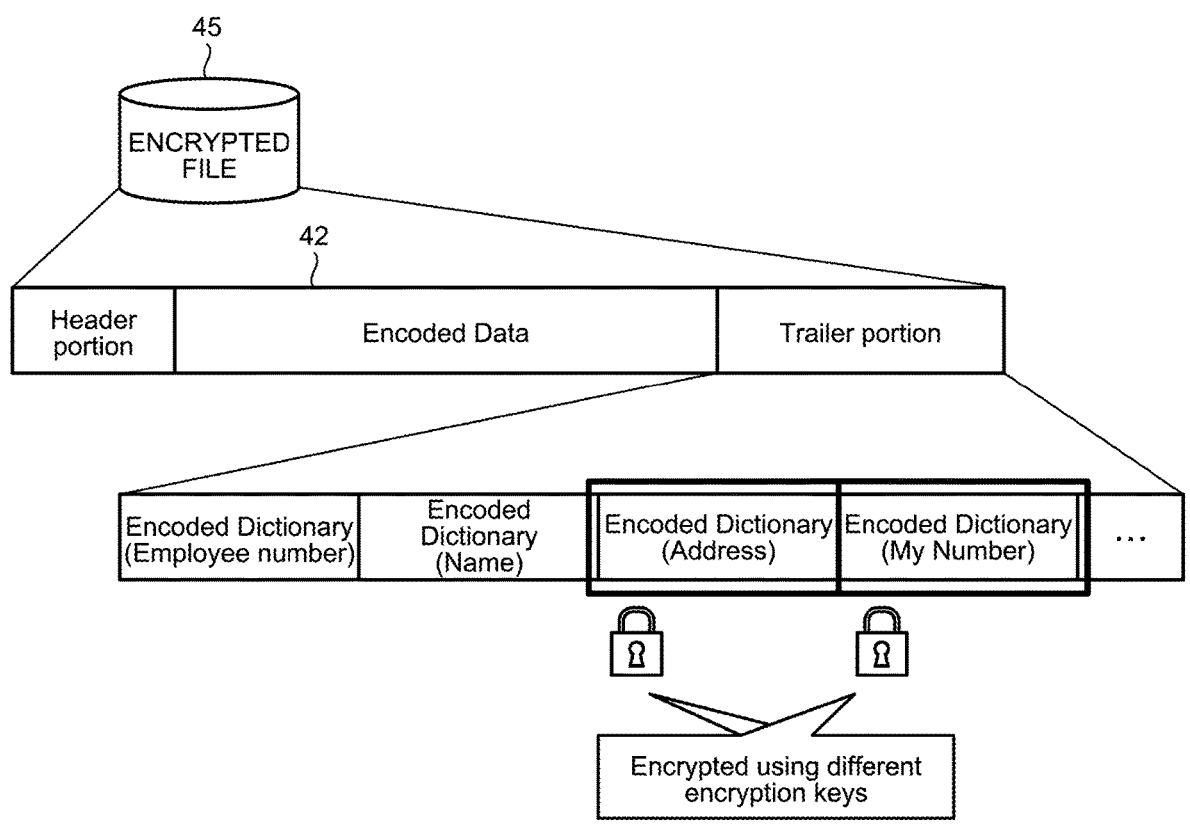
FIG. 3 is a diagram illustrating an example of a data structure of an encrypted file.

FIG. 3 is a diagram illustrating an example of a data structure of the encrypted file. In the example of FIG. 3, the encrypted file 45 includes the encoded data 42 in the data portion and the encoded dictionary 41 for each item in the trailer portion. In the example of FIG. 3, the encoded dictionaries 41 of an item of Address and an item of My Number are encrypted with different encryption keys respectively.

The encrypted file 45 is transmitted to a decoding device, which will be explained later, of the printing base 12 via the external I/F 31.

Figure 4:
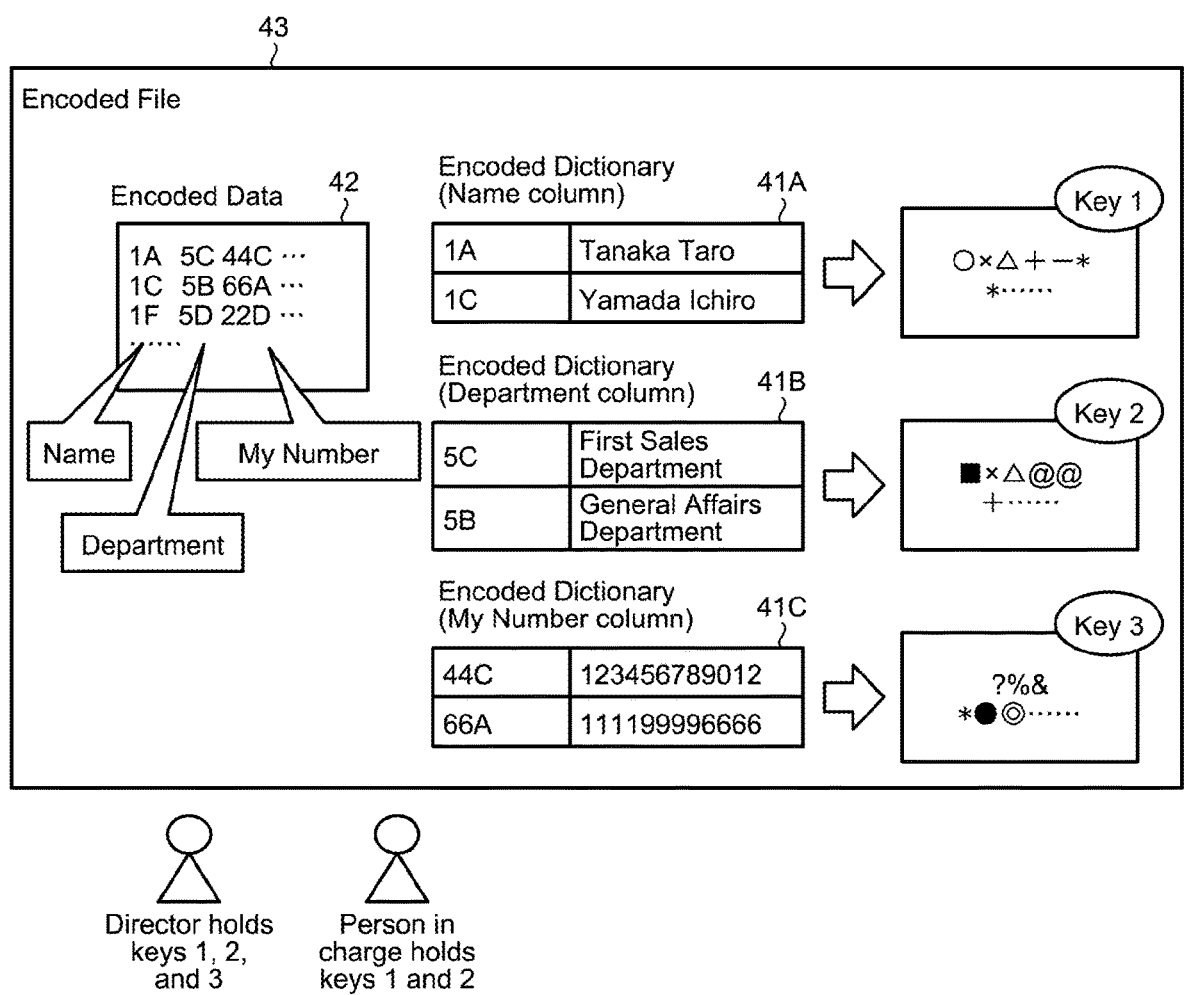
FIG. 4 is a diagram illustrating an example of encoding.

An example of encoding will be explained herein. FIG. 4 is a diagram illustrating an example of encoding. FIG. 4 schematically represents the encoded file 43, in which the encoded data 42 and encoded dictionaries 41A to 41C corresponding to respective items of the encoded data 42 are represented. The data for the item of Name in the encoded data 42 is converted into a code with the encoded dictionary 41A. For example, a code "1A" is stored in the item of Name. Name "Tanaka Taro" corresponding to the code "1A" is registered in the encoded dictionary 41A. The data for the item of Department in the encoded data 42 is converted into a code with the encoded dictionary 41B. For example, a code "5C" is stored in the item of Department. Department "First Sales Department" corresponding to the code "5C" is registered in the encoded dictionary 41B. The data For the item of My Number in the encoded data 42 is converted into a code with the encoded dictionary 41C. For example, a code "44C" is stored in the item of My Number. My Number "123456789012" corresponding to the code "44C" is registered in the encoded dictionary 41C.

Data of each item in the encoded data 42 is encoded and can be restored to the original data by reading the data corresponding to the code from the encoded dictionaries 41A to 41C. Here, for example, when the encoded dictionaries 41A to 41C are respectively encrypted, the code of each item is not capable of being restored to its original data. In other words, when the encoded dictionaries 41A to 41C are respectively encrypted, the data can be indirectly encrypted in the encoded data 42. In addition, when the encoded dictionaries 41A to 41C are encrypted with different encryption keys, data can be individually encrypted for each item in the encoded data 42. The example of FIG. 4 represents cases where the encoded dictionary 41A is encrypted by using Key 1, the encoded dictionary 41B is encrypted by using Key 2, and the encoded dictionary 41C is encrypted by using Key 3. In this way, by individually encrypting the encoded dictionaries 41A to 41C, the security of the data can be flexibly controlled for each item in the encoded data 42, thus reducing the risk of information leakage. For example, a director who holds the Keys 1 to 3 for decoding can decode all the items of Name, Department, and My Number of the encoded data 42 to the original data. On the other hand, a person in charge who holds the Keys 1 and 2 for decoding can decode the items of Name and Department of the encoded data 42 to the original data, but is not capable of correctly decoding the item of My Number to the original data.

For example, conventionally, when the file including the confidential information is to be concealed, it is conceivable to encrypt the entire file. For example, a method of compressing a CSV file to a ZIP file etc. using a compression format such as Zip format and of encrypting the compressed file can be considered. However, when the entire file is encrypted, all the information is decrypted upon decoding, which causes the risk of information leakage.

For example, it is also conceivable that the CSV file is encrypted for each record. However, when the CSV file is to be encrypted for each record, all the lines to be used have to be decrypted upon using the encrypted file, which causes a processing speed to be low. In addition, when the CSV file is to be encrypted for each record, different keys have to be prepared for all the lines, which is not realistic for the data with a large number of records. Moreover, because the compression is performed after the encryption, the compression ratio becomes low.

In addition, for example, a method of encrypting only the item of confidential information in the CSV file is conceivable. However, the CSV file is variable-length data, which is recognized as a string by the delimiter such as ",". On the other hand, as a result of encrypting the item of confidential information, for example, a character code indicating the delimiter such as "," is likely to be generated coincidentally. Because of this, there is a problem that the method of encrypting only the item of confidential information is not capable of correctly reading the data structure of the CSV file. Therefore, another method is also conceivable, that is, the method including separately defining the length of data of an item (number of characters) and encrypting the item of confidential information with a fixed length. However, in the method of encrypting the item of confidential information with the fixed length, waste arises in the data of the items. For example, it is considered that encryption of a 128-bit Advanced Encryption Standard (AES) block cipher or the like is performed on a column with a comparatively short data length (My Number, Name, Gender, etc.) for each predetermined size. In this case, because the data of the item to be encrypted is set to a predetermined size, a padding bit is added, and the data size of the CSV file increases. For example, 12-digit My Number is 48 bits in the case of BCD number. When the 128-bit AES block encryption is performed on the 12-digit My Number, padding bits are added to be 128 bits, so that the size of the data is enlarged to 2.5 times or more.

For example, when confidential information is not included in the CSV file and there is authority to view the confidential information, a method of separately acquiring only the confidential information is conceivable. However, because only the confidential information is separately acquired, it is not possible to ensure whether these data are the same data. For example, There are documents that need to preserve the original. For example, forms including My Number, medical records of hospitals, and documents with obligation to preserve by law are need preserve the originals of the documents. The preservation of original is also permitted to store it as electronic data. On the other hand, a method of separately holding the confidential information and the CSV file and separately acquiring only the confidential information results in not conforming to preservation of the original, which may cause a problem.

On the other hand, the encoding method according to the present embodiment is capable of compressing the text file 40 with a high compression ratio because the text file 40 such as the CSV file is encoded to the encoded data 42 using the encoded dictionary 41 for each item. Moreover, the encoding method according to the present embodiment can flexibly protect the information for each item because the encoded dictionary 41 of each item is encrypted. In addition, in the encoding method according to the present embodiment, the padding bit or the like causing an increase in data size is not added to the data of items for encryption. The encoding method according to the present embodiment is capable of responding to the preservation of the original by storing the encrypted file 45.

Figure 5:
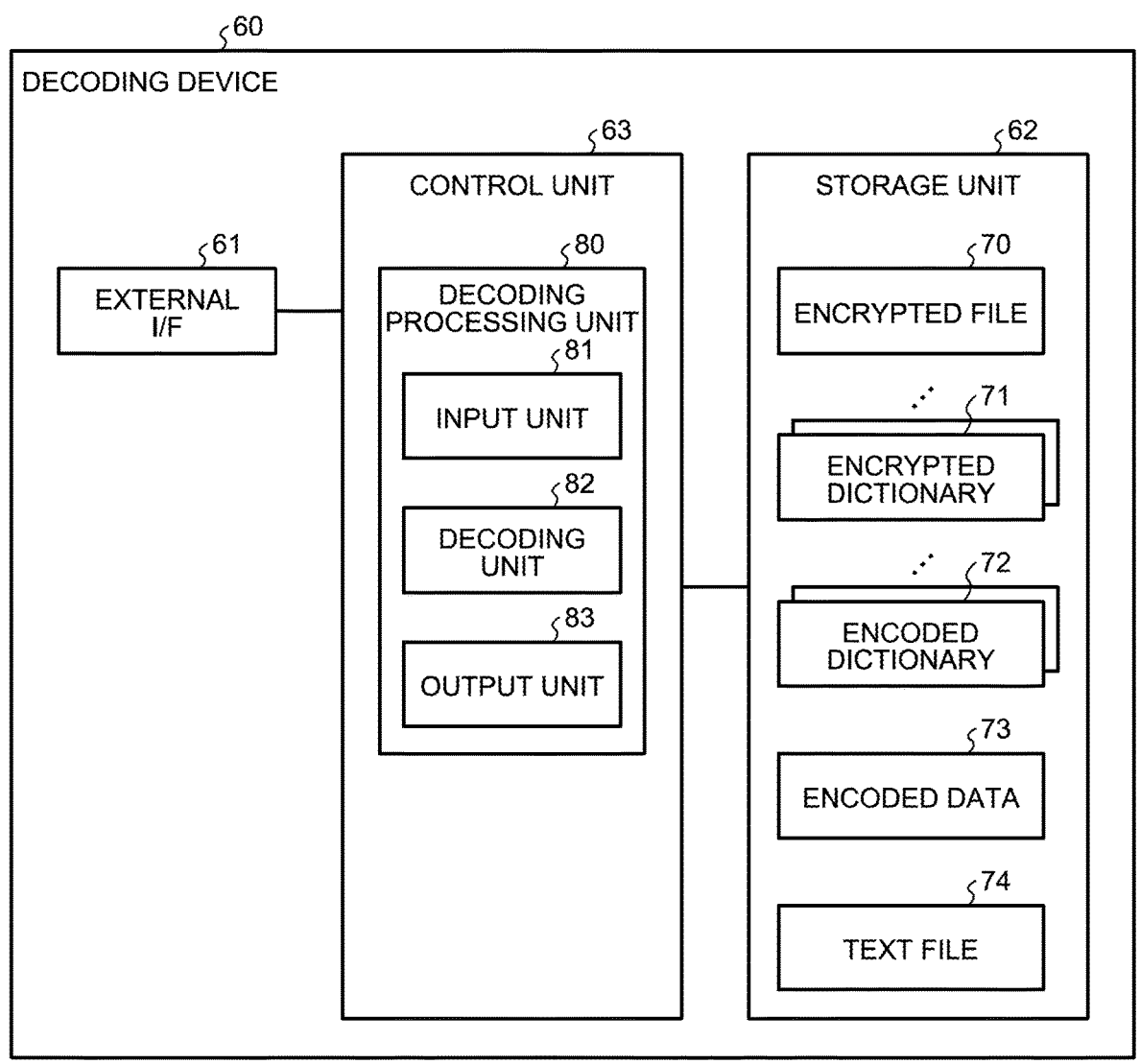
FIG. 5 is a diagram illustrating an example of a configuration of a decoding device.

A configuration of a decoding device 60 will be explained next. FIG. 5 is a diagram illustrating an example of the configuration of the decoding device. The decoding device 60 is a device that decodes the data compressed or encrypted. The decoding device 60 is an information processing device such as a computer including a personal computer and a server computer, a tablet terminal, and a smartphone. For example, in the example of FIG. 1, the decoding device 60 is a computer that decrypts the encrypted file 23 in the printing base 12. The decoding device 60 may be implemented as a single computer or as a cloud by a plurality of computers. The present embodiment will explain a case, as an example, where the decoding device 60 is implemented as a single computer. As illustrated in FIG. 5, the decoding device 60 includes an external I/F 61, a storage unit 62, and a control unit 63. However, the decoding device 60 may include any device other than the devices that the computer or the information processing device has.

The external I/F 61 is, for example, an interface that transmits/receives various pieces of information to/from other devices. The external I/F 61 is a port that inputs/outputs data to/from a storage medium such as a flash memory, a communication port that performs wired communication using a cable or the like, or a communication interface that performs wireless communication.

The storage unit 62 is a storage device such as a hard disk, an SSD, and an optical disk. The storage unit 62 may also be a data-rewritable semiconductor memory such as a RAM, a flash memory, and a NVSRAM.

The storage unit 62 stores an OS and various programs executed by the control unit 63. For example, the storage unit 62 stores programs for performing decoding processing, encrypted-dictionary decryption processing, and encoded-data decoding processing, which will be explained later. Moreover, the storage unit 62 stores various data used in the programs executed by the control unit 63. For example, the storage unit 62 stores an encrypted file 70, an encrypted dictionary 71, an encoded dictionary 72, encoded data 73, and a text file 74.

The encrypted file 70 stores the encrypted file 45 encrypted and transmitted by the encoding device 30. The encrypted file 45 encrypted and transmitted from the encoding device 30 is stored in the storage unit 62 as the encrypted file 70. The encrypted file 70 includes the encoded data 42 and the encrypted dictionary 44.

The encrypted dictionary 71 stores the encrypted dictionary 44 included in the encrypted file 70. The encoded dictionary 72 stores the data obtained by decrypting the encrypted dictionary 71. When the encrypted dictionary 71 is decrypted with a proper decryption key, the encoded dictionary 72 is restored in the same way as the encoded dictionary 41.

The encoded data 73 stores the encoded data 42 included in the encrypted file 70. The text file 74 stores the data obtained by decoding the encoded data 73 with the encoded dictionary 72. When the encoded dictionary 72 is restored in the same way as the encoded dictionary 41, the text file 74 is restored in the same way as the text file 40.

The control unit 63 is a device that controls the decoding device 60. As the control unit 63, an electronic circuit such as a CPU and a MPU and an integrated circuit such as an ASIC and an FPGA can be adopted. The control unit 63 includes an internal memory for storing programs that define various procedures and control data, and executes various types of processing using these programs and data. The control unit 63 functions as various processing units by operating the various programs. For example, the control unit 63 includes a decoding processing unit 80.

The decoding processing unit 80 decrypts the encrypted file 70. The decoding processing unit 80 corresponds to the decoding processing unit 25 in the example of FIG. 1. The decoding processing unit 80 includes an input unit 81, a decoding unit 82, and an output unit 83.

The input unit 81 receives an input of the encrypted file 70 to be decrypted. For example, the encrypted file 70 stored in the storage unit 62 is input to the input unit 81.

The decoding unit 82 decrypts the encrypted file 70. For example, the decoding unit 82 stores encrypted dictionaries 44 included in the encrypted file 70 in the storage unit 62 as encrypted dictionaries 71. Then, the decoding unit 82 decrypts the encrypted dictionaries 71 with respective predetermined decryption keys, and stores the decrypted encoded dictionaries 72 in the storage unit 62. The decryption key may be input by the user or may be acquired from the device that stores the decryption key of each item according to the authority of the user for each user. Here, when the encrypted dictionary 71 is not decrypted with the proper decryption key, it is not restored to the encoded dictionary 41. When the entire encrypted file 70 is encrypted, the decoding unit 82 decrypts the encrypted file 70 with the decryption key corresponding to the encryption key with which the entire encrypted file 70 is encrypted.

The output unit 83 stores the encoded data 42 included in the encrypted file 70, as the encoded data 73, in the storage unit 62. The output unit 83 uses the encoded dictionary 72 decoded by the decoding unit 82 to convert the code of each item in the encoded data 73 into the data, and generates the text file 74 in which the codes are converted into the data. For example, the output unit 83 uses the encoded dictionary 72 corresponding to the item in which the confidential information is stored to convert the code of the item, in which the confidential information of the encoded data 73 is stored, into the data. For an item other than the item in which the confidential information is stored, the output unit 83 uses the encoded dictionary 72 corresponding to other item to convert the code of the other item into the data. For example, when the item information indicating an encoded item is included in the encoded dictionary 72, the output unit 83 uses the encoded dictionary 72 to convert the code of the item indicated by the item information into the data. On the other hand, when the item information indicating the encoded item is not included in the encoded dictionary 72, the output unit 83 uses each encoded dictionary 72 to convert the code of the item indicated by the item information into the data. Here, when the encrypted dictionaries 71 is not restored to the encoded dictionary 41, the encoded dictionaries 72 have no data corresponding to the codes. Thus, when the encoded dictionary 72 corresponding to the item in which the confidential information is stored is not restored, the data of the item in which the confidential information is stored is not restored. For example, when the encoded dictionary 72 corresponding to the item of My Number is not restored, My Number is not restored. When there is no data corresponding to the code, the output unit 83 may set the code as the data of the item as it is, or may convert the code into a specific character, or may set the data as a blank and does not output the code.

The output unit 83 outputs the generated text file 74 to the storage unit 62 and stores it therein. The output unit 83 may output the generated text file 74 to other program or other device.

Figure 6:
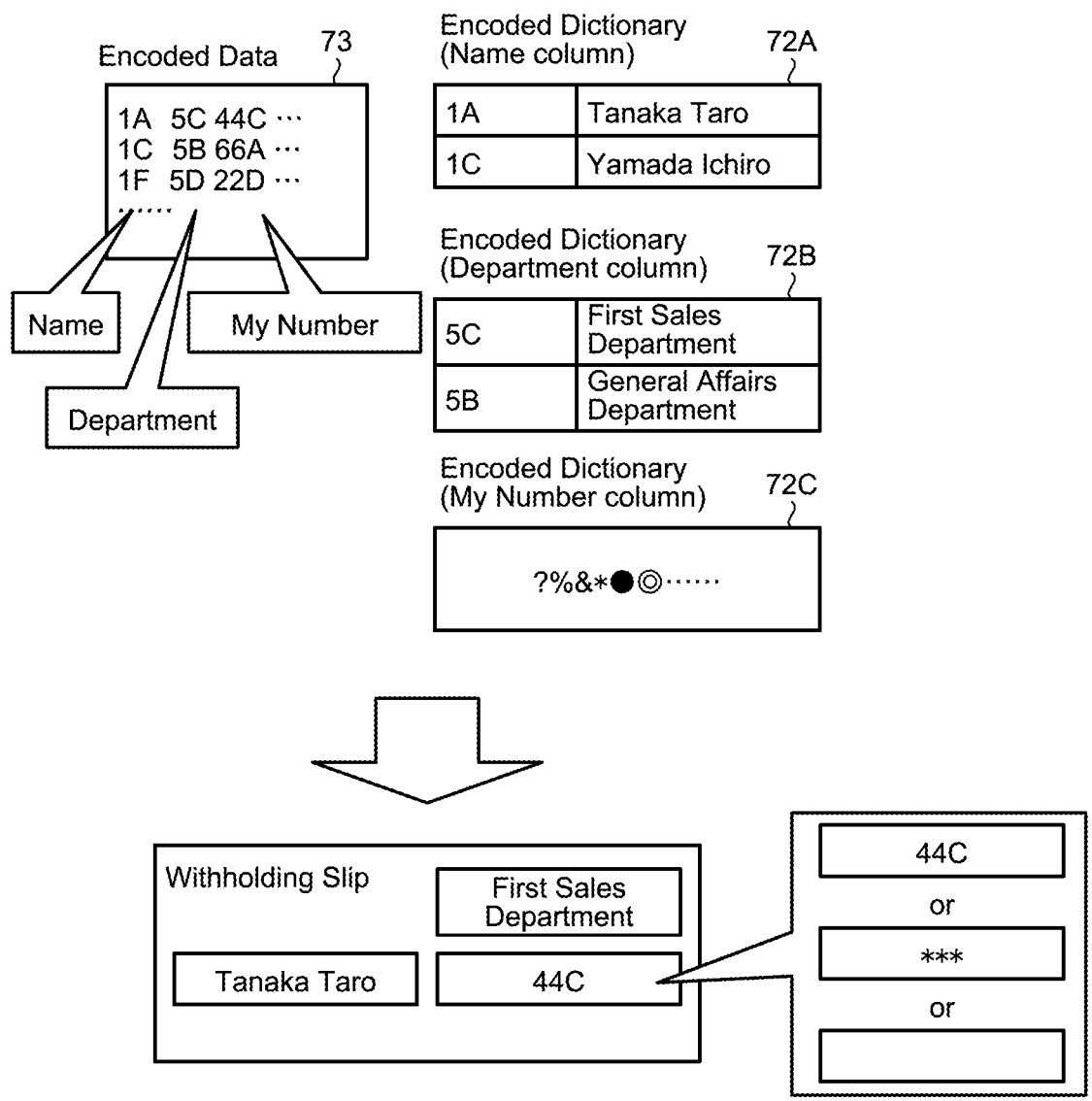
FIG. 6 is a diagram illustrating an example of decoding.

An example of decoding will be explained herein. FIG. 6 is a diagram illustrating an example of decoding. FIG. 6 represents the encoded data 73 including the items of Name, Department, and My Number, and encoded dictionaries 72A to 72C respectively corresponding to the items of the encoded data 73. The encoded dictionary 72A is decoded correctly, and the code and the data of the item of Name are stored therein in association with each other. The encoded dictionary 72B is also decoded correctly, and the code and the data of the item of Department are stored therein in association with each other. The encoded dictionary 72C is not decoded correctly, and the item of My Number is in the encrypted state.

The output unit 83 uses encoded dictionaries 72A to 72C to convert the code of each item of the encoded data 73 into the data. The example of FIG. 6 represents the conversion result of the code in a first record of the encoded data 73. For example, the code "1A" of the item of Name is converted into "Tanaka Taro". The code "5C" of the item of Department is converted into "First Sales Department". On the other hand, the code "44C" of the item of My Number is not in the encoded dictionary 72C, and is therefore output without any change. When there is no data corresponding to the code, the output unit 83 may convert the code into a specific character ("*" in the example of FIG. 6) and output the specific character, or may output a blank. This makes it possible to protect the information for the item of My Number.

Flow of Processing

Figure 7:
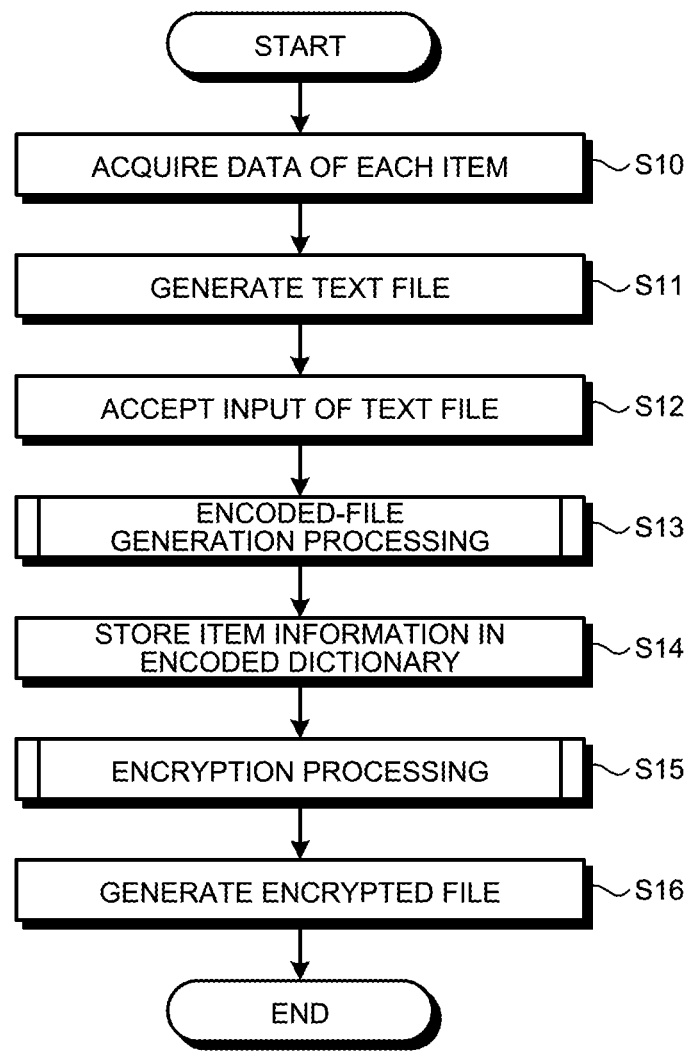
FIG. 7 is a flowchart illustrating an example of a procedure of encoding processing.

A flow of various types of processing executed by the encoding device 30 and the decoding device 60 according to the present embodiment will be explained next. First of all, a flow of encoding processing in which the encoding device 30 encodes the text file 40 will be explained. FIG. 7 is a flowchart illustrating an example of a procedure of encoding processing. The encoding processing is executed in a predetermined timing, for example, a timing in which the processing of the data generating unit 50 is executed.

As illustrated in FIG. 7, the data generating unit 50 acquires data of each item stored in the text file 40 (S10). For example, when a withholding slip is to be printed in the example of FIG. 1, the data generating unit 50 acquires data of the items of Name, Gender, and My Number from the DB 13 and the DB 14. The data generating unit 50 generates the text file 40 having a plurality of records obtained by separating the data of the acquired items with a delimiter (S11).

The input unit 52 receives an input of the text data to be encoded (S12). The first generating unit 53 executes encoded-file generation processing (S13).

Figure 8:
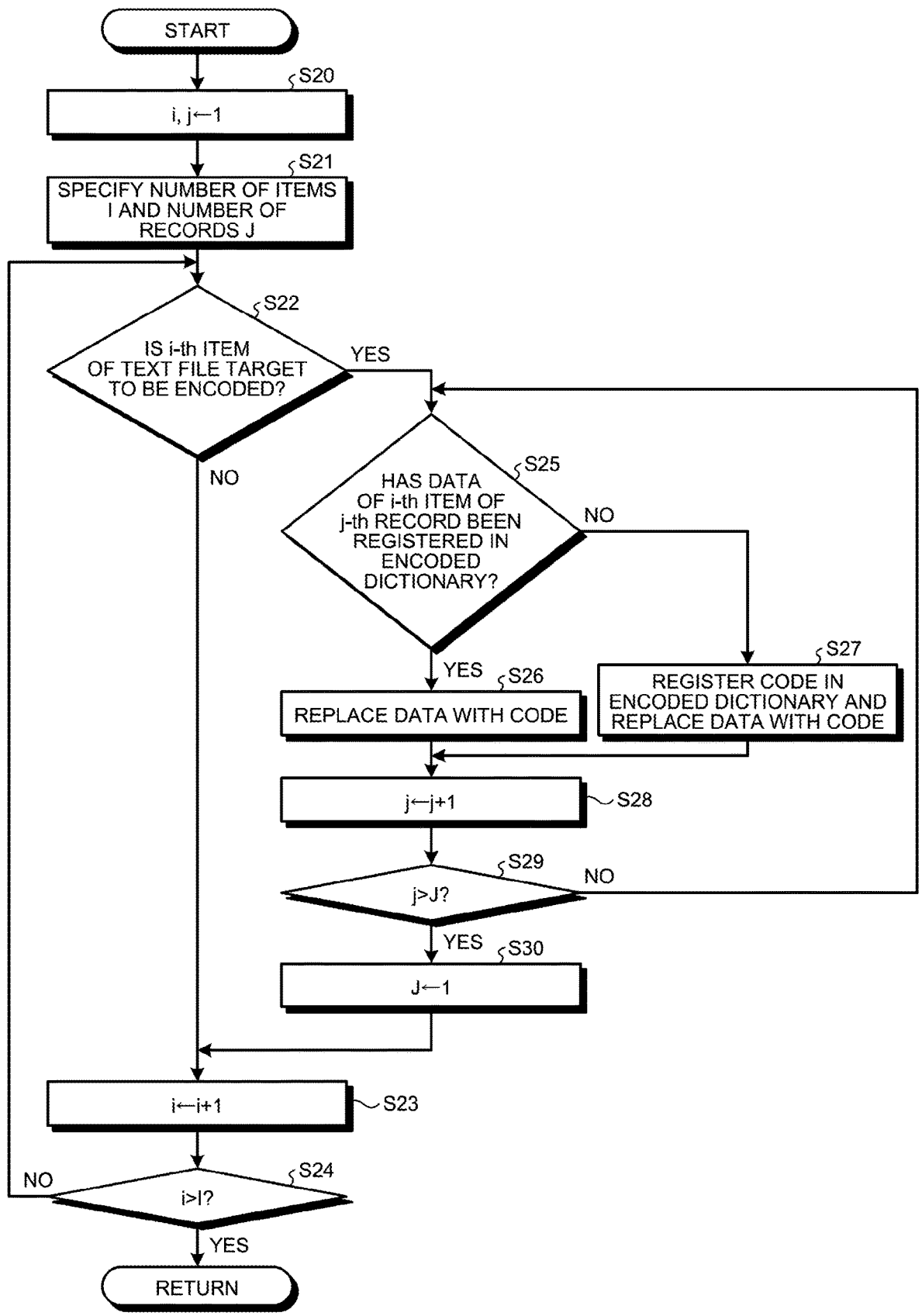
FIG. 8 is a flowchart illustrating an example of a procedure of encoded-file generation processing.

FIG. 8 is a flowchart illustrating an example of a procedure of the encoded-file generation processing. The encoded-file generation processing is executed at a predetermined timing, for example, at S13 of the encoding processing.

As illustrated in FIG. 8, the first generating unit 53 stores 1 in parameter i and in parameter j, respectively (S20). The first generating unit 53 specifies the number of items I and the number of records J of the text file 40 (S21).

The first generating unit 53 determines whether an i-th item of the text file 40 is an item to be encoded (S22). Whether the item is to be encoded is predetermined. For example, an item in which confidential information is stored is an item to be encoded. When it is not the item to be encoded (No at S22), the first generating unit 53 adds 1 to the value of parameter i (S23). The first generating unit 53 determines whether the value of parameter i is larger than the number of items I (S24). When the value of parameter i is not larger than the number of items I (No at S24), the process proceeds to S22.

Meanwhile, when the value of parameter i is larger than the number of items I (Yes at S24), the process ends the encoded-file generation processing and proceeds to S14 of the encoding processing illustrated in FIG. 7.

On the other hand, when it is the item to be encoded (Yes at S22), the first generating unit 53 determines whether the data of the i-th item of a j-th record in the text file 40 has been registered in the encoded dictionary 41 corresponding to the i-th item (S25). When it has been registered in the encoded dictionary 41 (Yes at S25), the first generating unit 53 replaces the data of the i-th item of the j-th record with the code corresponding to the data which is registered in the encoded dictionary 41 corresponding to the i-th item (S26).

When it has not been registered in the encoded dictionary 41 (No at S25), the first generating unit 53 assigns a code to the data of the i-th item of the j-th record in the text file 40. Then, the first generating unit 53 registers the assigned code and the data in the encoded dictionary 41 corresponding to the i-th item in association with each other, and replaces the data with the assigned code (S27).

The first generating unit 53 adds 1 to the value of parameter j (S28). The first generating unit 53 determines whether the value of parameter j is larger than the number of records J (S29). When the value of parameter j is not larger than the number of records J (No at S29), the process proceeds to S25.

Meanwhile, when the value of parameter j is larger than the number of records J (Yes at S29), the first generating unit 53 stores 1 in the parameter j (S30), and proceeds to S23.

Referring back to FIG. 7, the second generating unit 54 stores item information indicating the encoded item in the encoded dictionary 41 (S14). The second generating unit 54 executes the encryption processing (S15).

Figure 9:
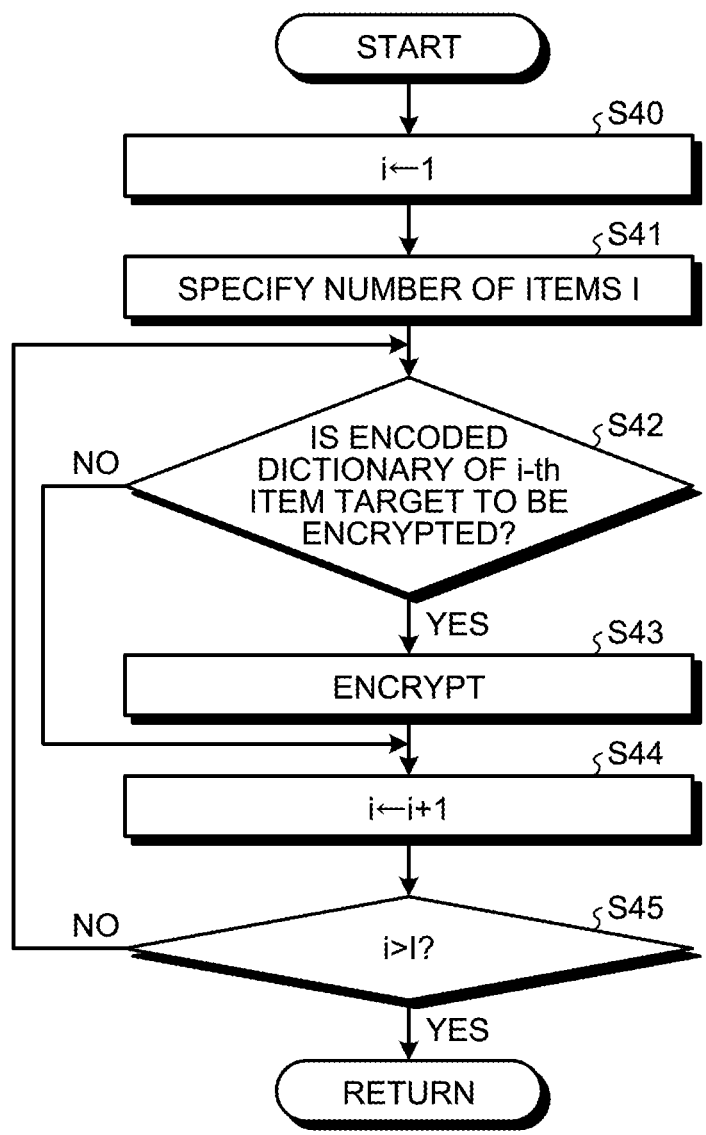
FIG. 9 is a flowchart illustrating an example of a procedure of encryption processing.

FIG. 9 is a flowchart illustrating an example of a procedure of the encryption processing. The encryption processing is executed at a predetermined timing, for example, at S15 of the encoding processing.

As illustrated in FIG. 9, the second generating unit 54 stores 1 in parameter i (S40). The second generating unit 54 specifies the number of items I of the text file 40 (S41).

The second generating unit 54 determines whether an i-th item of the text file 40 is an item to be encrypted (S42).

Whether an item is to be encrypted is predetermined. For example, the item in which confidential information is stored is an item to be encrypted. When it is the item to be encrypted (Yes at S42), the second generating unit 54 encrypts the encoded dictionary 41 corresponding to the i-th item of the text file 40 (S43). When the encoded dictionary 41 corresponding to the i-th item has already been encrypted, the second generating unit 54 does not have to encrypt it again. The second generating unit 54 adds 1 to the value of parameter i (S44). Meanwhile, when it is not the item to be encrypted (No at S42), the process proceeds to S44.

The second generating unit 54 determines whether the value of parameter i is larger than the number of items I (S45). When the value of parameter i is not larger than the number of items I (No at S45), the process proceeds to S42.

Meanwhile, when the value of parameter i is larger than the number of items I (Yes at S45), the second generating unit 54 ends the encryption processing and proceeds to S15 of the encoding processing illustrated in FIG. 7.

Referring back to FIG. 7, the second generating unit 54 generates the encrypted file 45 that includes the encoded data 42 as the data portion and the encoded dictionary 41 or the encrypted dictionary 44 as the trailer portion (S16) for each item, and ends the encoding processing.

Figure 10:
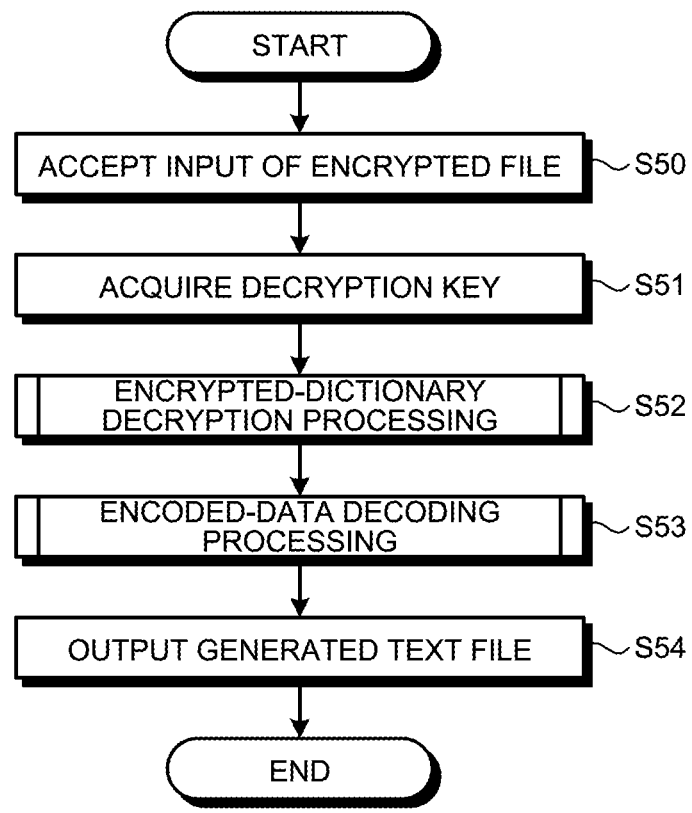
FIG. 10 is a flowchart illustrating an example of a procedure of decoding processing.

A flow of decoding processing in which the decoding device 60 decrypts the encrypted file 45 will be explained next. FIG. 10 is a flowchart illustrating an example of a procedure of decoding processing. The decoding processing is executed at a predetermined timing, for example, timing in which the encrypted file 70 to be decrypted is specified and the start of the decryption processing is instructed.

As illustrated in FIG. 10, the input unit 81 receives an input of the encrypted file 70 to be decrypted (S50). The decoding unit 82 acquires a decryption key (S51). For example, the decoding unit 82 acquires a decryption key for each item according to the authority of the user using the encrypted file 70 from the device that stores the decryption key for each item according to the authority of the user for each user.

The decoding unit 82 executes encrypted-dictionary decryption processing (S52).

Figure 11:
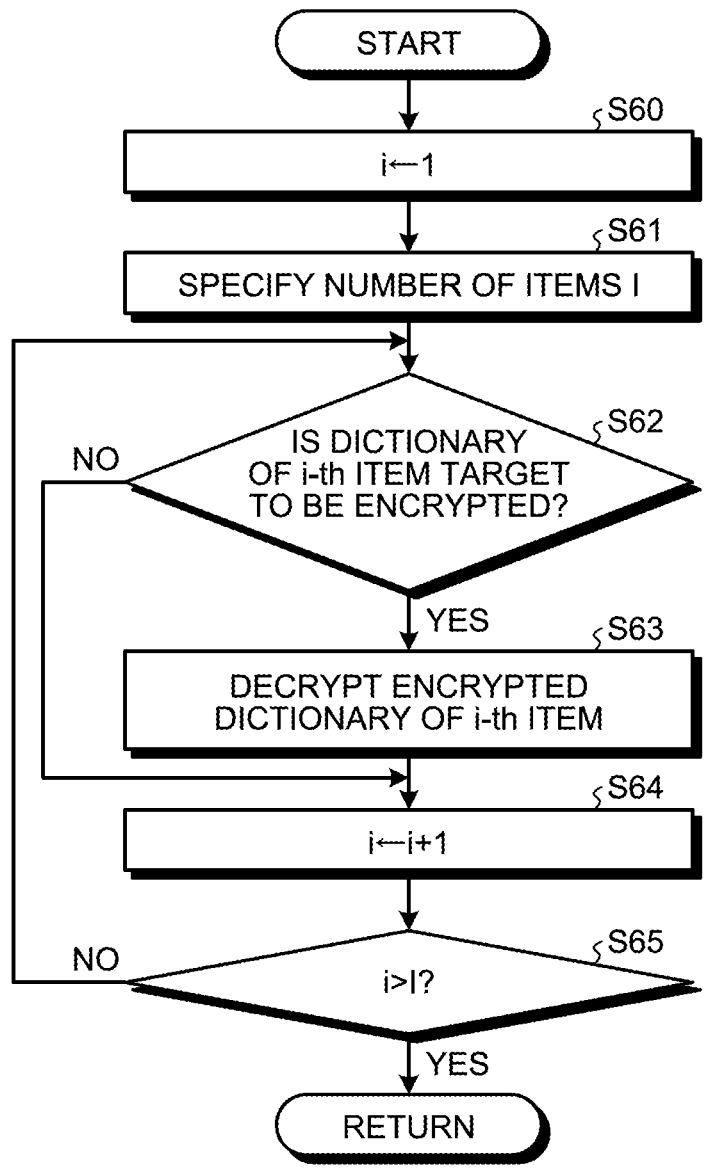
FIG. 11 is a flowchart illustrating an example of a procedure of encrypted-dictionary decryption processing.

FIG. 11 is a flowchart illustrating an example of a procedure of the encrypted-dictionary decryption processing. The encrypted-dictionary decryption processing is executed at a predetermined timing, for example, at S52 of the decoding processing.

As illustrated in FIG. 11, the decoding unit 82 stores 1 in parameter i (S60). The decoding unit 82 specifies the number of items I of the encoded data 42 included in the encrypted file 70 (S61).

The decoding unit 82 determines whether an i-th item of the encoded data 42 is an item to be encrypted (S62). Whether an item is to be encrypted may be determined by storing information as to whether the item is to be encrypted is stored, for example, in the encrypted file 70 and from the information. An item in which the decryption key is acquired may be determined as an item to be encrypted. When it is the item to be encrypted (Yes at S62), the decoding unit 82 decodes the encoded dictionary 72 corresponding to the i-th item (S63). When the encoded dictionary 72 corresponding to the i-th item has already been decoded, the decoding unit 82 does not have to decode it again. The decoding unit 82 adds 1 to the value of parameter i (S64). Meanwhile, when it is not the item to be encrypted (No at S62), the process proceeds to S64.

The decoding unit 82 determines whether the value of parameter i is larger than the number of items I (S65). When the value of parameter i is not larger than the number of items I (No at S65), the process proceeds to S62.

Meanwhile, when the value of parameter i is larger than the number of items I (Yes at S65), the decoding unit 82 ends the encrypted-dictionary decryption processing and proceeds to S53 of the decoding processing illustrated in FIG. 10.

Referring back to FIG. 10, the decoding unit 82 executes encoded-data decoding processing (S53).

Figure 12:
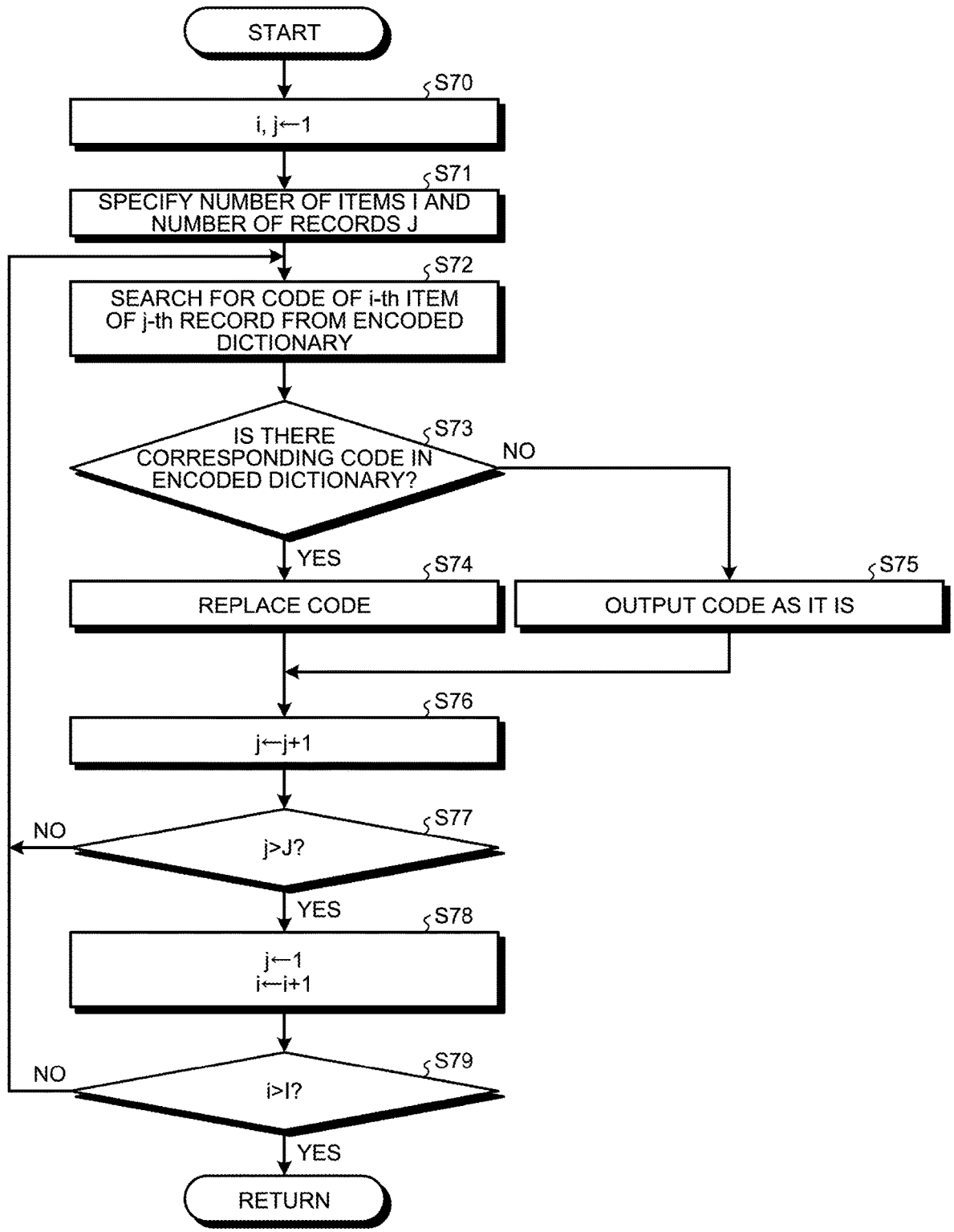
FIG. 12 is a flowchart illustrating an example of a procedure of encoded-data decoding processing.

FIG. 12 is a flowchart illustrating an example of a procedure of the encoded-data decoding processing. The encoded-data decoding processing is executed at a predetermined timing, for example, at S53 of the decoding processing.

As illustrated in FIG. 12, the decoding unit 82 stores 1 in parameter i and in parameter j, respectively (S70). The decoding unit 82 specifies the number of items I and the number of records J of the encoded data 73 (S71).

The decoding unit 82 searches for a code of the i-th item of the j-th record in the text file 40 from the encoded dictionary 72 corresponding to the i-th item (S72). The decoding unit 82 determines whether there is the code in the encoded dictionary 72 corresponding to the i-th item as a result of searching (S73). When there is the code (Yes at S73), the decoding unit 82 replaces the code of the i-th item of the j-th record in the text file 40 with the data corresponding to the code stored in the encoded dictionary 72 corresponding to the i-th item (S74).

Meanwhile, when there is no code (No at S73), the decoding unit 82 sets the code to the data of the i-th item of the j-th record as it is (S75).

The decoding unit 82 adds 1 to the value of parameter j (S76). The first generating unit 53 determines whether the value of parameter j is larger than the number of records J (S77). When the value of parameter j is not larger than the number of records J (No at S77), the process proceeds to S72.

Meanwhile, when the value of parameter j is larger than the number of records J (Yes at S77), the decoding unit 82 stores 1 in the parameter j and adds 1 to the value of parameter i (S78). The first generating unit 53 determines whether the value of parameter i is larger than the number of items I (S79). When the value of parameter i is not larger than the number of items I (No at S79), the process proceeds to S72.

Meanwhile, when the value of parameter i is larger than the number of items I (Yes at S79), the decoding unit 82 ends the encoded-data decoding processing and proceeds to S54 of the decoding processing illustrated in FIG. 10.

Referring back to FIG. 10, the output unit 83 outputs the generated text file 74 to the storage unit 62 and stores it therein (S54), and ends the decoding processing.

Advantageous Effects

As explained above, the encoding device 30 according to the present embodiment inputs thereto the text file 40 having a plurality of records each including a plurality of items which are separated by a delimiter. The encoding device 30 generates the encoded file 43 having the encoded data 42 and the encoded dictionary 41 each in which specific items included in the records of the input text file 40 are encoded by word or numerical value. The encoding device 30 generates the encrypted file 45 including the encrypted dictionary 44 obtained by encrypting the encoded dictionary 41 from the generated encoded file 43. As a result, the encoding device 30 can flexibly protect the information for a specific item.

The encoding device 30 according to the present embodiment generates the encoded data 42, in which items other than the specific items included in the records of the text file 40 are encoded by word or numerical value, and the encoded dictionary 41 for each item. As a result, the encoding device 30 can encode the text file 40 with a high compression ratio.

The encoding device 30 according to the present embodiment generates the encoded dictionary 41 including the item information indicating the encoded item. As a result, the encoding device 30 can duplicate the code for each encoded dictionary 41, and can therefore compress it with a higher compression ratio. Moreover, upon restoration, the encoded dictionary 41 corresponding to the encoded item can be promptly specified.

The encoding device 30 according to the present embodiment generates the encrypted file 45 in which the encoded dictionary 41 of the entire encoded file 43 or of the item other than the specific item is encrypted with an encryption key different from that for the encryption of the encoded dictionary 41 of the specific item. As a result, the encoding device 30 can conceal the entire encoded file 43.

The decoding device 60 according to the present embodiment inputs thereto the encrypted file 70. The decoding device 60 decrypts the encrypted dictionary 71 of the input encrypted file 70 with a predetermined decryption key. The decoding device 60 outputs the text file 74 in which the specific item is decoded by using the decrypted encoded dictionary 72. As a result, the decoding device 60 can flexibly protect the information for the specific item according to the purpose of using the encrypted file 70.

When there is no code of a specific item in the encoded dictionary 72, the decoding device 60 according to the present embodiment outputs the code as it is. Here, in general, when there is no code of the specific item in the encoded dictionary 72, decryption becomes an error. On the other hand, when there is no code of the specific item in the encoded dictionary 72, the decoding device 60 according to the present embodiment recognizes that the data corresponding to the code has no authority to refer to, and outputs the code without any change. As a result, the decoding device 60 can conceal the data corresponding to the code of the specific item.

When there is no code of the specific item in the encoded dictionary 72, the decoding device 60 according to the present embodiment converts the code into a specific character and outputs the converted code, or does not output the code. As a result, for example, when the data corresponding to the code has no authority to refer to, the decoding device 60 can conceal the data corresponding to the code of the specific item.

[b] Second Embodiment

Although the embodiment related to the disclosed devices has been explained so far, the disclosed technology may be implemented in various different forms in addition to the embodiment. Therefore, another embodiment included in the present invention will be explained below.

For example, the respective components of the illustrated devices are functionally conceptual, and the components are not necessarily configured as physically illustrated ones. In other words, the specific mode of decentralization and integration of the devices is not limited to the illustrated ones. Namely, it may be configured by functionally or physically decentralizing or integrating all or part of the devices in an arbitrary unit according to the various kinds of load and usages. For example, the processing units such as the input unit 52, the first generating unit 53, and the second generating unit 54 of the encoding processing unit 51, and the input unit 81, the decoding unit 82, and the output unit 83 of the decoding processing unit 80 may be appropriately integrated. Each processing of the processing units may be separated appropriately to each processing of a plurality of processing units. The processing units may be provided in a single device. For example, the encoding device 30 may further include the input unit 81, the decoding unit 82, and the output unit 83 of the decoding processing unit 80. Furthermore, all or arbitrary part of the processing functions performed in the respective processing units can be implemented by a CPU and a program analyzed and executed by the CPU, or can be implemented as hardware by wired logic.

Encoding Program

Figure 13:
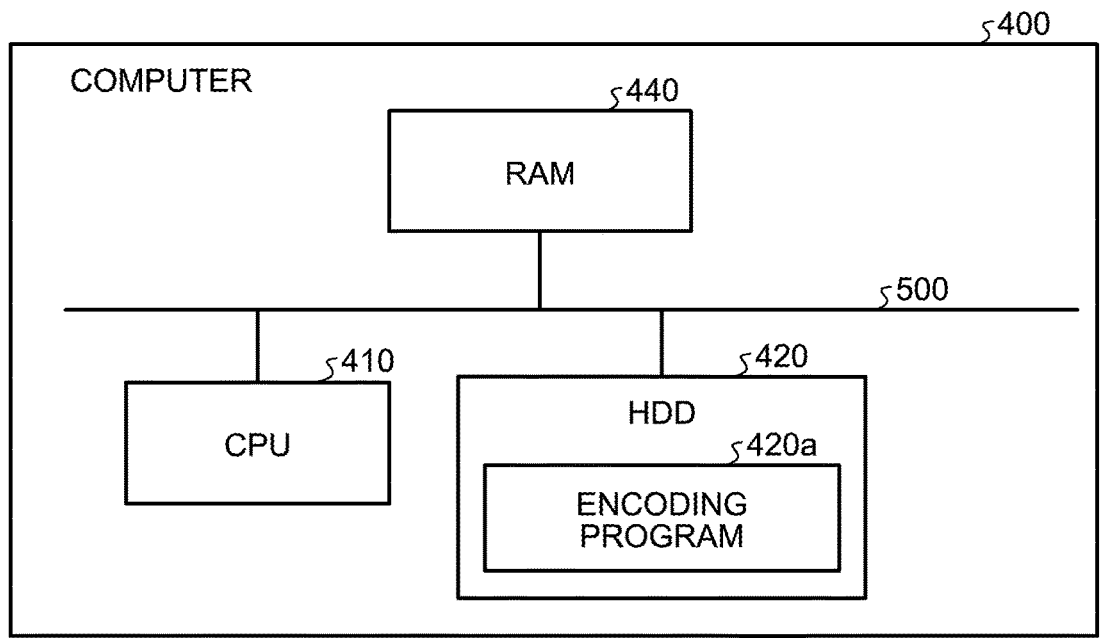
FIG. 13 is a diagram illustrating an example of a computer that executes an encoding program.

The various types of processing explained in the embodiments can be implemented by a computer system such as a personal computer or a work station executing a previously prepared program. Therefore, an example of the computer system that executes a program having the same function as that of the embodiments will be explained below. First of all, the encoding program that performs the encoding processing will be explained. FIG. 13 is a diagram illustrating an example of a computer that executes the encoding program.

As illustrated in FIG. 13, a computer 400 includes a central processing unit (CPU) 410, a hard disk drive (HDD) 420, and a random access memory (RAM) 440. The units 400 to 440 are connected to each other via a bus 500.

The HDD 420 previously stores an encoding program 420a for performing the same function as that of the encoding processing unit 51 (the input unit 52, the first generating unit 53, and the second generating unit 54) of the encoding device 30. The encoding program 420a may be separated.

The HDD 420 stores various pieces of information. For example, the HDD 420 stores OS and various data used for encoding.

The CPU 410 reads the encoding program 420a from the HDD 420 and executes it, and thereby executes the same operations as these of the processing units according to the embodiments. In other words, the encoding program 420a performs the same operation as that of the encoding processing unit 51.

The encoding program 420a does not always need to be stored in the HDD 420 from the beginning.

Decoding Program

Figure 14:
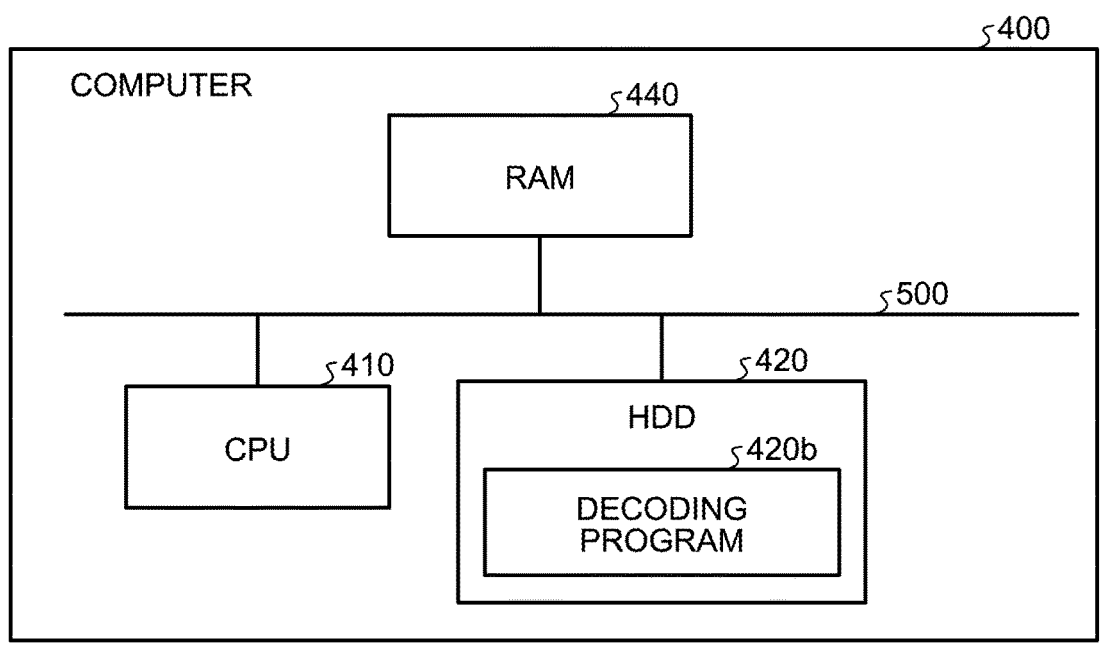
FIG. 14 is a diagram illustrating an example of a computer that executes a decoding program.

The decoding program that performs decoding processing will be explained next. FIG. 14 is a diagram illustrating an example of a computer that executes the decoding program. The same reference signs are assigned to the same portions as these of FIG. 13, and explanation thereof is omitted.

As illustrated in FIG. 14, the HDD 420 previously stores an decoding program 420b for performing the same function as that of the decoding processing unit 80 (the input unit 81, the decoding unit 82, and the output unit 83) of the decoding device 60. The decoding program 420b may be separated.

The HDD 420 stores various pieces of information. For example, the HDD 420 stores OS and various data used for searching.

The CPU 410 reads the decoding program 420b from the HDD 420 and executes it, and thereby executes the same operations as these of the processing units according to the embodiments. In other words, the decoding program 420b performs the same operation as that of the decoding processing unit 80.

In addition, the decoding program 420b does not always need to be stored in the HDD 420 from the beginning.

For example, the encoding program 420a and the decoding program 420b may be stored in a "portable physical medium" such as a flexible disk (FD), a compact disk read only memory (CD-ROM), a digital versatile disk (DVD), a magneto-optical disk, and an integrated circuit (IC) card, each of which is inserted into the computer 400. The computer 400 may be configured to read a program from one of the mediums and execute the program.

Furthermore, the programs may be stored in "other computers (or servers)" or the like connected to the computer 400 via a public line, the Internet, a local area network (LAN), or a wide area network (WAN). Then, the computer 400 may read the program from one of them and execute the program.

According to one aspect of the present invention, it is possible to flexibly protect the information of a specific item.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:
   inputting a text file having a plurality of records each including a plurality of items which are separated by a delimiter;
   encoding a specific item included in the records of the inputted text file by generating encoded data of word or numerical value included in the specific item wherein the word or numerical value and the generated encoded data corresponding thereto are stored in an encoded dictionary;
   generating an encoded file by including therein another item than the specific item, the encoded specific item and the encoded dictionary; and
   generating an encrypted file by including therein the another item, the encoded specific item and an encrypted dictionary that is generated by encrypting the encoded dictionary, from the generated encoded file.

2. The computer-readable recording medium according to claim 1, wherein
   the process further includes:
   encoding the another item by generating encoded data of word or numerical value included in the another item using another encoded dictionary than the encoded dictionary for the specific item; and
   generating an encoded file including the encoded another item, the encoded specific item, the another encoded dictionary and the encoded dictionary for the specific item.

3. The computer-readable recording medium according to claim 1, wherein
   the process of encoding the specific item includes:
   generating the encoded dictionary including item information indicating the encoded specific item.

4. The computer-readable recording medium according to claim 2, wherein
   when encrypting the generated encoded file in its entirety or encrypting the another encoded dictionary, an encryption key different from that for encryption of the encoded dictionary of the specific item is used.

5. An encoding method comprising:
   inputting, by a processor, a text file having a plurality of records each including a plurality of items which are separated by a delimiter;
   encoding, by the processor, a specific item included in the records of the inputted text file by generating encoded data of word or numerical value included in the specific item wherein the word or numerical value and the generated encoded data corresponding thereto are stored in an encoded dictionary;
   generating, by the processor, an encoded file by including therein another item than the specific item, the encoded specific item and the encoded dictionary; and
   generating, by the processor, an encrypted file by including therein the another item, the encoded specific item and an encrypted dictionary that is generated by encrypting the encoded dictionary, from the generated encoded file.

6. An encoding device comprising:
   a processor that executes a process, the process including:
   inputting a text file having a plurality of records each including a plurality of items which are separated by a delimiter;
   encoding a specific item included in the records of the inputted text file by generating encoded data of word or numerical value included in the specific item wherein the word or numerical value and the generated encoded data corresponding thereto are stored in an encoded dictionary;
   generating an encoded file by including therein another item than the specific item, the encoded specific item and the encoded dictionary; and
   generating an encrypted file by including therein the another item, the encoded specific item and an encrypted dictionary that is generated by encrypting the encoded dictionary, from the generated encoded file.

7. A non-transitory computer-readable recording medium having stored therein a program that causes a computer to execute a process comprising:
   inputting an encrypted file including an encoded specific item of a specific item, another item than the specific item and an encrypted dictionary, wherein
   the specific item is included in a plurality of items included in a plurality of records included in a text file, the plurality of items being separated by a delimiter,
   the specific item is encoded as the encoded specific item by generating encoded data of word or numerical value included in the specific item wherein the word or numerical value and the generated encoded data corresponding thereto are stored in an encoded dictionary,
   an encoded file is generated by including therein the another item, the encoded specific item and the encoded dictionary, and
   the encrypted file is generated by including therein the another item, the encoded specific item and the encrypted dictionary that is generated by encrypting the encoded dictionary, from the generated encoded file;

decrypting the encrypted dictionary of the inputted encrypted file by using a predetermined decryption key; and outputting the text file in which the encoded specific item is decoded by using the decrypted encoded dictionary.

8. The non-transitory computer-readable recording medium according to claim 7, wherein, when the decryption is not performed, the outputting includes outputting the text file that includes the encoded specific item as it is.

9. The non-transitory computer-readable recording medium according to claim 8, wherein the outputting includes outputting the text file where the encoded specific item is converted into a specific character, or not included.

10. A decoding method comprising:

inputting, by a processor, an encrypted file including an encoded specific item of a specific item, another item than the specific item and an encrypted dictionary, wherein the specific item is included in a plurality of items included in a plurality of records included in a text file, the plurality of items being separated by a delimiter, the specific item is encoded as the encoded specific item by generating encoded data of word or numerical value included in the specific item wherein the word or numerical value and the generated encoded data corresponding thereto are stored in an encoded dictionary, an encoded file is generated by including therein the another item, the encoded specific item and the encoded dictionary, and the encrypted file is generated by including therein the another item, the encoded specific item and the encrypted dictionary that is generated by encrypting the encoded dictionary, from the generated encoded file;

decrypting, by the processor, the encrypted dictionary of the inputted encrypted file by using a predetermined decryption key; and outputting, by the processor, the text file in which the encoded specific item is decoded by using the decrypted encoded dictionary.

11. A decoding device comprising: a processor that executes a process, the process comprising:

inputting an encrypted file including an encoded specific item of a specific item, another item than the specific item and an encrypted dictionary, wherein the specific item is included in a plurality of items included in a plurality of records included in a text file, the plurality of items being separated by a delimiter, the specific item is encoded as the encoded specific item by generating encoded data of word or numerical value included in the specific item wherein the word or numerical value and the generated encoded data corresponding thereto are stored in an encoded dictionary, an encoded file is generated by including therein the another item, the encoded specific item and the encoded dictionary, and the encrypted file is generated by including therein the another item, the encoded specific item and the encrypted dictionary that is generated by encrypting the encoded dictionary, from the generated encoded file;

decrypting the encrypted dictionary of the inputted encrypted file by using a predetermined decryption key; and outputting the text file in which the encoded specific item is decoded by using the decrypted encoded dictionary.

* * * * *